US007675874B2

(12) United States Patent
Jennings, III et al.

(10) Patent No.: US 7,675,874 B2
(45) Date of Patent: Mar. 9, 2010

(54) PEER-TO-PEER INSTANT MESSAGING AND CHAT SYSTEM

(75) Inventors: Raymond B. Jennings, III, Ossining, NY (US); Jason D. LaVoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/064,724

(22) Filed: Feb. 24, 2005

(65) Prior Publication Data

US 2006/0209727 A1    Sep. 21, 2006

(51) Int. Cl.
*H04L 12/16* (2006.01)
(52) U.S. Cl. ...................................................... 370/260
(58) Field of Classification Search ................ 370/260, 370/351, 395.2; 719/313, 319, 328; 709/204, 709/227, 243
See application file for complete search history.

(56) References Cited

U.S. PATENT DOCUMENTS

| 6,167,432 | A  | * | 12/2000 | Jiang ........................... 709/204 |
|-----------|----|---|---------|--------------------------------------------|
| 7,120,668 | B2 | * | 10/2006 | Manber et al. ............... 709/205 |
| 7,185,057 | B2 | * | 2/2007  | Brown et al. ................. 709/206 |
| 7,203,753 | B2 | * | 4/2007  | Yeager et al. ................ 709/225 |
| 7,325,034 | B2 | * | 1/2008  | Douglis et al. .............. 709/205 |
| 2001/0029455 | A1 | * | 10/2001 | Chin et al. ................... 704/277 |
| 2003/0023684 | A1 | * | 1/2003  | Brown et al. ................. 709/204 |
| 2003/0055894 | A1 | * | 3/2003  | Yeager et al. ................ 709/204 |
| 2005/0091380 | A1 | * | 4/2005  | Gonen et al. ................. 709/227 |
| 2006/0123116 | A1 | * | 6/2006  | Rahman et al. .............. 709/227 |

FOREIGN PATENT DOCUMENTS

CN    1096774 C    12/2002

OTHER PUBLICATIONS

Intanagonwiwat, C., et al.; "Directed Diffusion: A Scalable and Robust Communication Paradigm for Sensor Networks, Proceeding of the Sixth Annual International Conference on Mobile Computing and Networking", Aug. 31, 2000, pp. 56-67.
Wireless Medium Access Control (MAC) and Physical Layer(PHY) Specifications for Low-Rate Wireless Personal Area Networks (LR-WPANs), LAN/MAN Standards Committee , Oct. 1, 2003, pp. 112-114, The Institute of Electrical and Electronics Engineers, Inc. 3 Park Avenue, New York, NY 10016-5997, USA.

(Continued)

*Primary Examiner*—Ayaz R Sheikh
*Assistant Examiner*—Blanche Wong
(74) *Attorney, Agent, or Firm*—F. Chau & Associates, LLC

(57) ABSTRACT

Disclosed is a method for controlling access to a chat room using a peer-to-peer ("P2P") network. The method includes the steps of sending a search request to a first set of nodes in the P2P network, the first set of nodes neighboring a node requesting the search and including at least one node; forwarding the request to a second set of nodes neighboring the at least one node in the first set, the second set of nodes including at least one node; comparing the search request to a local profile topic list in each node in the first and second sets; receiving a zero or more responses from nodes in the first and second sets; and establishing a network connection between the node requesting the search and at least one of the nodes responding to the request to form a community.

8 Claims, 3 Drawing Sheets

OTHER PUBLICATIONS

M.J. Handy et al., Low energy adaptive clustering hierarchy with deterministic cluster-head selection, 2002 4th International Workshop on Mobile and Wireless Communications Network (Cat.No. 02EX614), Sep. 30, 2002, pp. 368-372. Institute of Applied Microelectronics and Computer Science University of Rostock, Ricard-Wagner-Str. 31, 18119 Rostock, Germany.

* cited by examiner

PEER-TO-PEER INSTANT MESSAGING AND CHAT SYSTEM

BACKGROUND OF THE INVENTION

1. Field of the Invention

The present invention relates generally to computing networks. It more particularly relates to peer-to-peer ("P2P") networks and to dynamically creating chat rooms and forming communities.

2. Description of Related Art

Conventional Internet chat systems use centralized servers. Within these systems, chat rooms are statically or dynamically created, but the rooms are publicly listed and are administered by the central server. Exemplary systems include chat rooms administered by AOL, MSN and Yahoo! These chat rooms do not allow for individual users to administer the chat rooms. In particular, individual users are limited with respect to managing chat room admission, i.e., cannot determine which and how many users can join a chat room.

Because of the centralized nature of Internet chat rooms, they are frequently targets of malicious users or "spammers" posting unrelated or off-topic messages such as advertisements. These off-topic messages effectively create a type of denial of service attack within the chat rooms by making the ratio of useful messages to spam messages very low.

Thus, there is a need in the art for a method and system for a peer-to-peer instant messaging and chat room system.

SUMMARY OF THE INVENTION

One embodiment of the present invention includes a plurality of computer nodes within a peer-to-peer network for the purpose of creating, finding, locating and participating in chat messaging. A requesting node may send a search request for a topic of interest within the P2P network. Responding nodes receive the search request and reply to the requesting node if the original search request matches one or more entries within the responders' topic profile. The matching process is not required to be an exact match but should meet some threshold in the matching criteria defined by the user or potential responding node. The responding node may send back its corresponding topic that matched the original search request, and it then decides whether or not to connect to the responding node, thus forming a community between the two nodes and possibly other nodes that had previously joined the community. Upon successful joining within the community, messages are exchanged between the nodes in the community. Nodes may leave a community by disconnecting the network connection to that community.

The messages may be text messages, but the messages are not so limited. Messages may also contain audio, video, pictures or other data.

DETAILED DESCRIPTION OF THE PREFERRED EMBODIMENTS

Aspects of the invention include the dynamic creation of chat rooms by using a P2P system, individual user administration of their own rooms, and selection of which and how many users are allowed to participate in a chat room. All those aspects aid in limiting the amount of spam that is sent to a chat room.

The aspect of creating chat rooms dynamically significantly limits the access of malicious users by creating specific-topic chat rooms. The more specific the topic of a chat room is, the more difficult it is for a malicious user to find it. For example, a chat room topic of "music" would be easily found. By contrast, a chat room topic of "music of the delta blues from 1912" would be significantly more difficult to locate.

The more specific a topic the more difficult it may be to find due to the nature of an infinite number of topics. The use of unlimited topics limits the effect of malicious users because it requires the malicious user to know the specific terms within a topic. Even if malicious users were able to gain access to a chat room, they can easily be disconnected and blocked from further access due to the decentralized administration.

In one embodiment, the present invention is a method and apparatus for dynamically creating network based chat/messaging rooms using P2P networking. Embodiments of the present invention enable nodes within a P2P network to dynamically create chat rooms by searching for and responding to topics of interest. The purpose of creating such chat rooms is to exchange messages and conversing. Nodes within the P2P network that find other nodes with similar interests can connect to each other, forming a community of two or more nodes. Any given node can be in any number of communities simultaneously. A node may join a community by establishing a network connection between itself and at least one of the nodes already in the community. A node may join a community by connecting to the node that responded to the search request although other methods are possible, such as being redirected to another node within the community.

Figure 1:
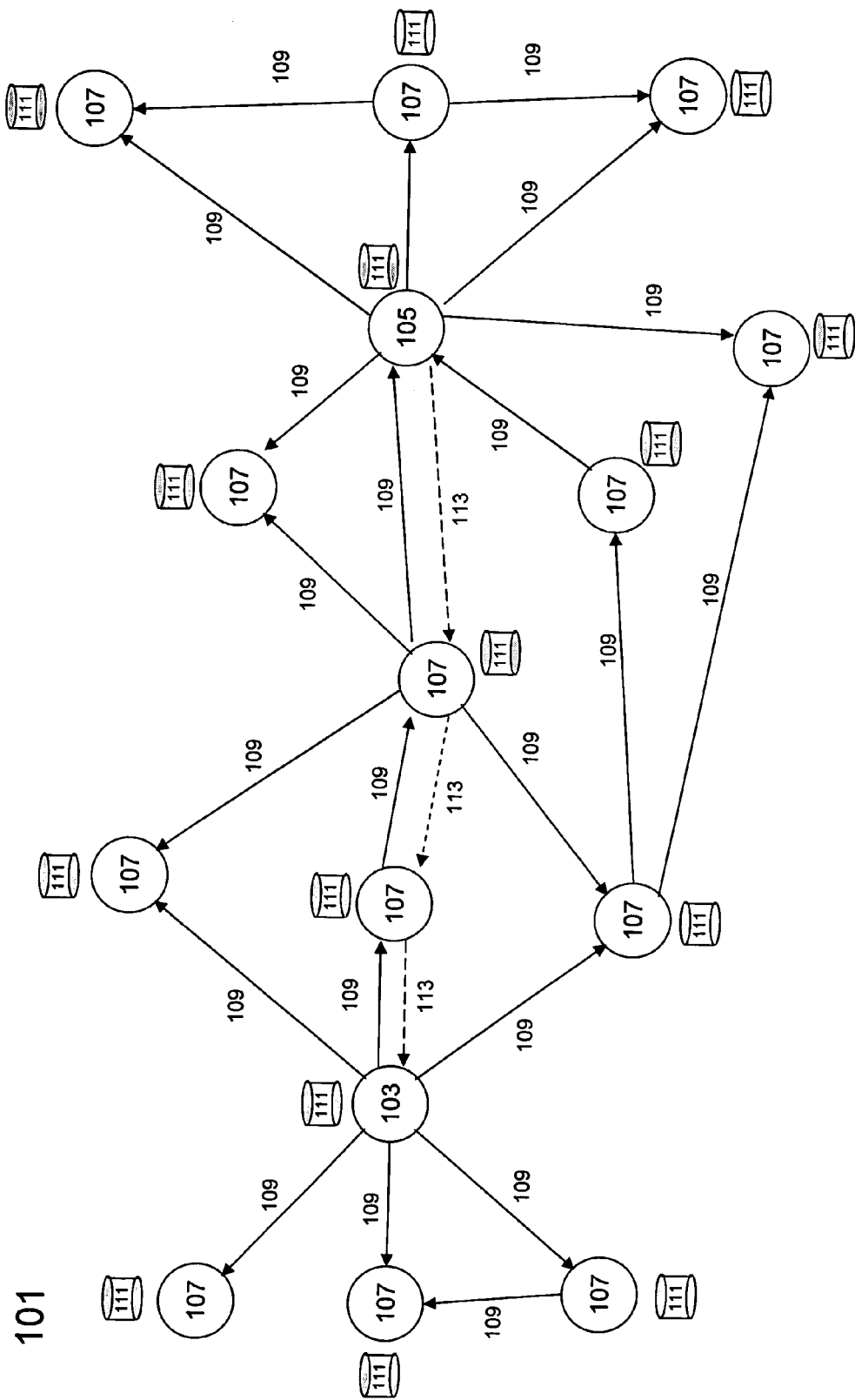
FIG. 1 is a schematic diagram of a network of nodes interacting in a peer-to-peer manner in accordance with one embodiment of the present invention.

FIG. 1 shows a P2P network 101. In the figure, node 103 is a node that originates a search request message 109 that is forwarded throughout the network 101. At least a subset of nodes within the network 101 compares the search request 109 to their local profiles 111.

A profile may include one or more topics of interest. The profile contains search words that search requests match at least partially. In addition, each profile entry may contain a response message indicating the topic that is returned to the requester. For example a profile may have an entry with the following search terms "Yoko Ono, Stuart Sutcliffe" and a response string of "Beatles Fifth Members." If a search request contains any or all of "Yoko Ono, Stuart Sutcliffe" then the node sends a search response back with "Beatles Fifth Members."

Nodes may compare search requests 109 to their local profiles 111 if they want other nodes to contact them for the purpose of creating new chat rooms or join existing chat rooms that they have created. If a node is busy, it may choose to ignore all requests but still forward those requests within the network. Zero or more responding nodes 105 send a reply message 113 back to the requesting node 103. Node 103 determines if the reply messages from the responding nodes 105 are of sufficient interest, and if so, then node 103 connects to one or more of the responding nodes 105 creating a community or joining an existing community.

Figure 2:
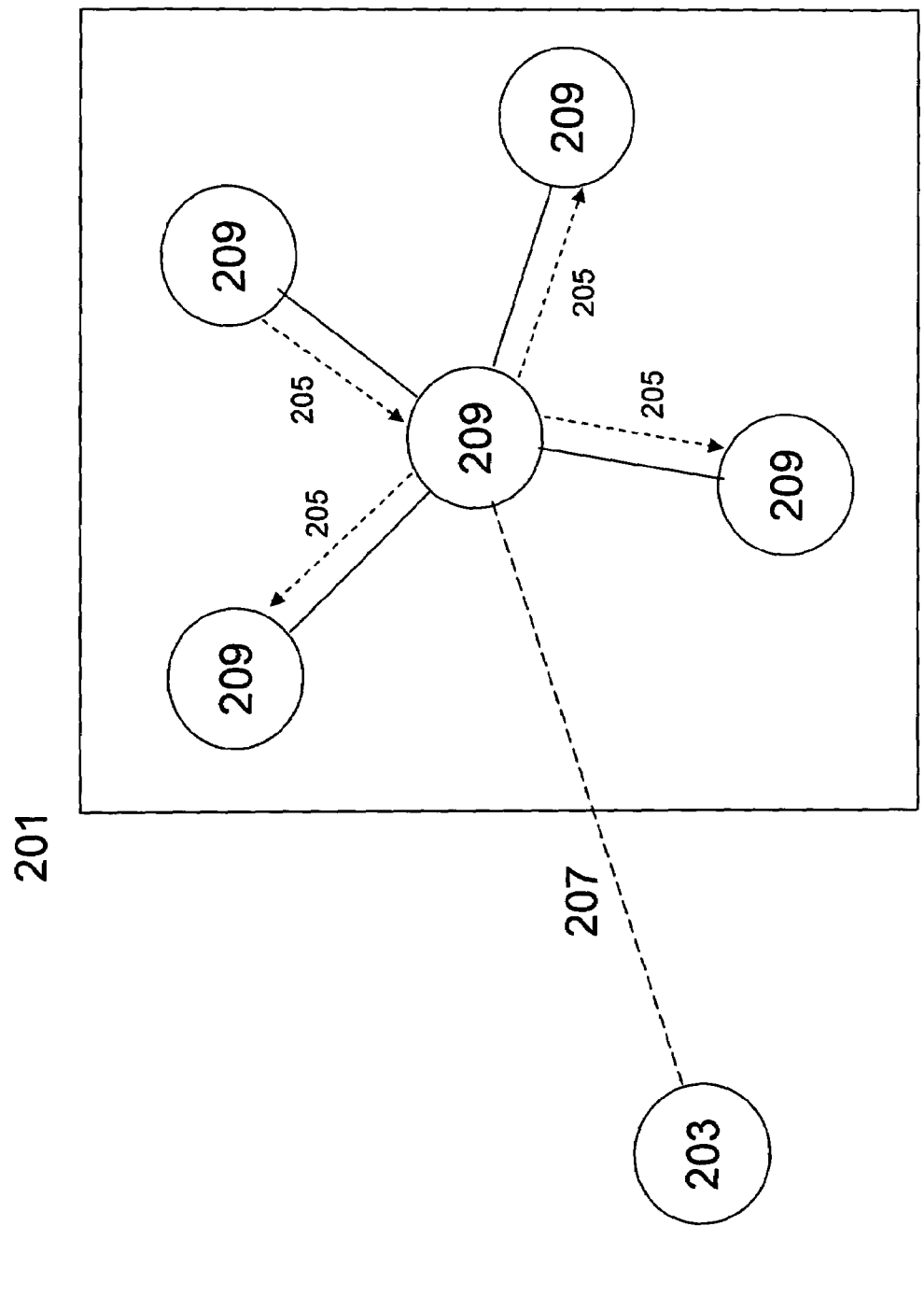
FIG. 2 illustrates a set of nodes participating in a community with an additional node in the process of joining the already existing community in accordance with one embodiment of the present invention.

FIG. 2 illustrates a community of nodes 201. A newly joining node 203 may join the community 201 by establishing a network connection 207 to one of the already existing nodes within the community 201. Any node within the community 201 can send a message 205 to the community 201. The message 205 may contain unique identifiers represented as bit patterns within the message to indicate the originator of the message as well as the instance number of a message. A computer name, network ID or username may be used to indicate the message originator and a unique number may indicate the message instance number. These two identifiers are used so that each node within the community can determine who sent a particular message and if the message had already been received based on the message instance number. A message instance number may be defined as a globally unique random number that increases by 1 for each message sent by a particular node within the group. The message instance numbers may be unique for the community in which they belong. When a newly joining node 203 joins the community, a message can be sent to all other nodes indicating that a new node has joined the community. A similar process occurs when a node leaves a community.

There may be cases when a community needs to reorganize the connections between the nodes of the community 201. Standard methods exist to elect nodes to become parents or leaders of other nodes thereby reducing the burden on any given node within the community.

Figure 3:
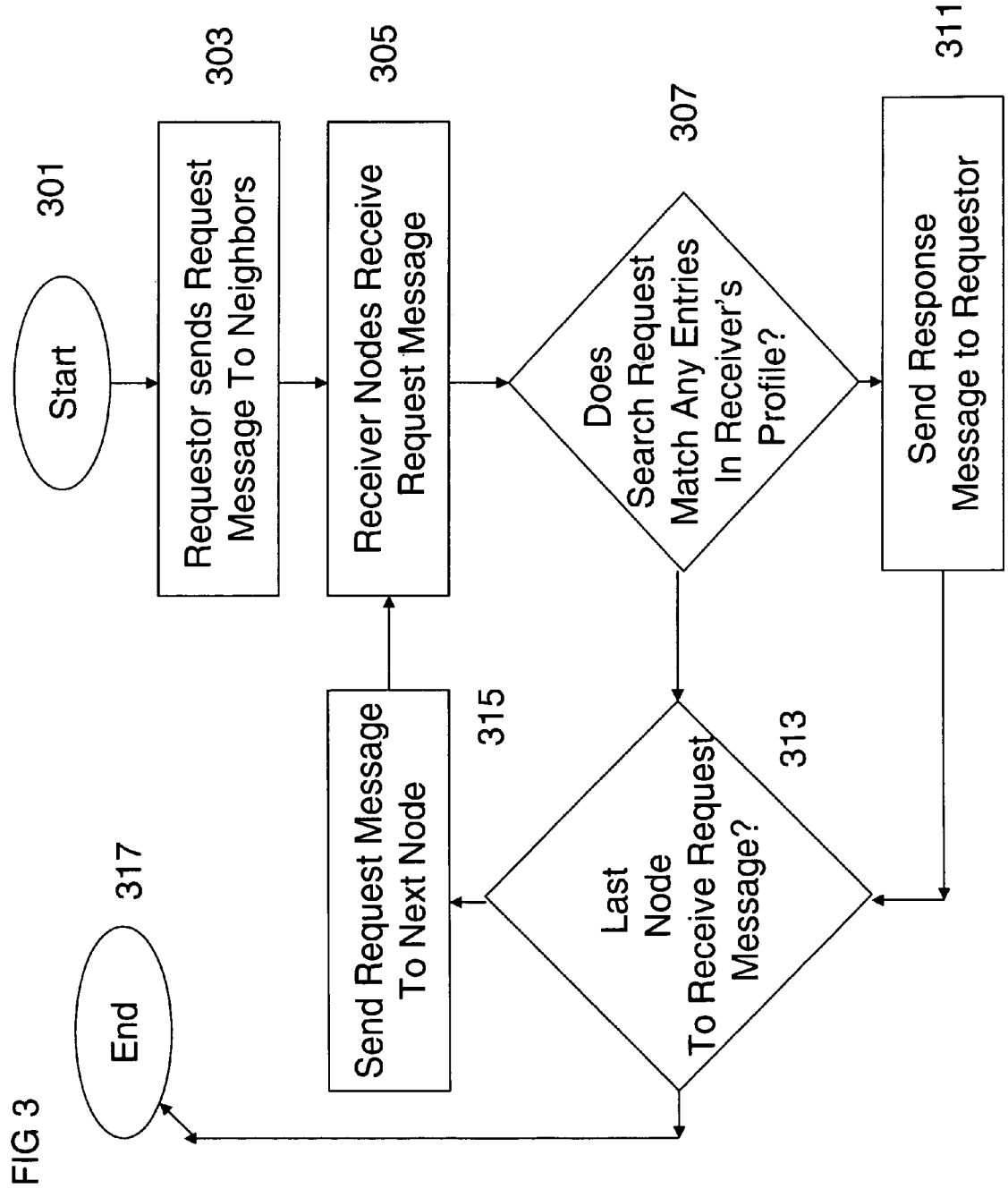
FIG. 3 shows a flow diagram of the steps used in finding, creating and joining a community in accordance with one embodiment of the present invention.

FIG. 3 is a flowchart outlining the steps in one embodiment of the present invention taken to establish and join a dynamically created community. The method starts 301 when a search request message is sent 303. The request message is received by one or more receivers 305 and each receiver compares the request message to its own topic profile. If the contents of the request message match one or more of the recipient's topics 307 then the recipient responds 311 to the search request with the recipient's matching topic and other data such as how many users are currently in the community and a maximum number of users. If the contents of the request message do not match then the process ends 313. The requestor compares the response received and decides whether or not to join the community by establishing a connection to the other node 315.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A method to control access of a first computer node of a plurality of nodes within a peer-to-peer (P2P) network to a chat community comprising a subset of the plurality of nodes other than the first node that are engaged in a chat about a topic by exchanging messages across the P2P network, the method comprising:

receiving, by all nodes of the subset, a request message across the P2P network from the first node, the request message indicating a request of the first node to access the chat community;

determining by each of the nodes of the subset whether to perform a comparison of contents of the request message with a topic profile list stored locally on each node;

sending a response message from each of the nodes whose comparisons indicate the contents match the topic across the P2P network to the first node;

determining whether the first node should access the chat community based on the response messages; and joining the first node to at least one of the responding nodes to enable access of the first node to the chat community based on the determination that the first node should access the chat community, wherein each response message includes the topic, a count of how many users are currently in the chat community, and a count of a maximum number of users allowed to engage in the chat community.

2. The method of claim 1 wherein the request message and the response message each have a unique node identifier and a unique message number.

3. The method of claim 1 wherein a message sent by any node within the chat community is then forwarded to all nodes within the community.

4. The method of claim 1, wherein connections between the nodes are redistributed to balance network traffic.

5. The method of claim 1, wherein the local profile topic list contains keywords for each node to match against the search request from the requesting node.

6. The method of claim 1, wherein all nodes in the community receive at least one copy of every message exchanged.

7. The method of claim 1, wherein a node leaves a community by disconnecting its network connection.

8. The method of claim 1, wherein all nodes within the community are notified when a new node joins or leaves the chat community.

* * * * *